Oct. 25, 1932.   F. J. BAKER   1,885,041
STOVE CABINET
Filed March 12, 1930
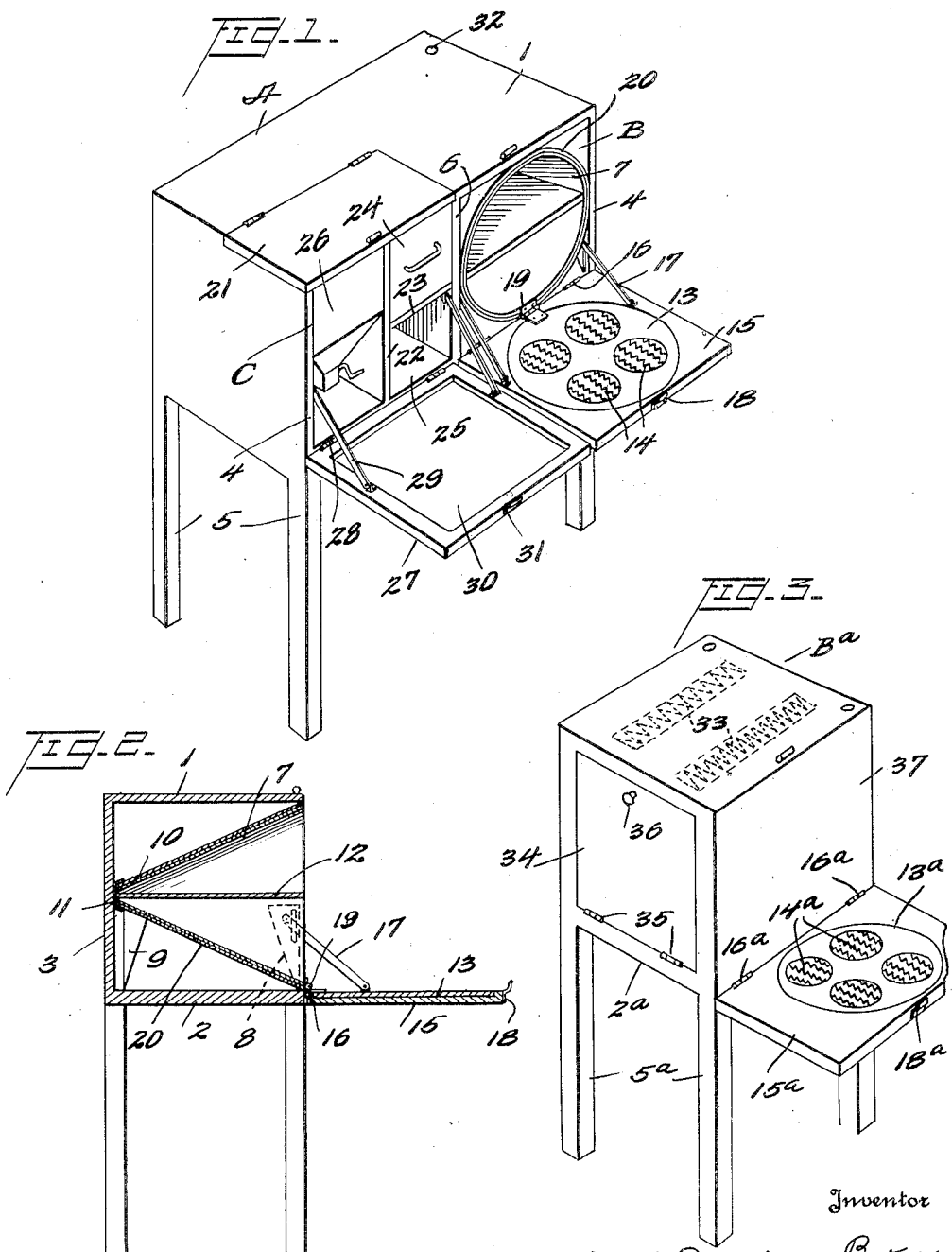

Patented Oct. 25, 1932

1,885,041

UNITED STATES PATENT OFFICE

FLOYD JENNINGS BAKER, OF WASHINGTON, DISTRICT OF COLUMBIA

STOVE-CABINET

Application filed March 12, 1930. Serial No. 435,258.

Generically this invention relates to stoves, but it more especially comprehends a combination stove-cabinet, including novel heating features and adapted to effect conservation of space and a reduction in production costs.

The principal object of this invention is the provision of a stove having a movable heating device adapted when in one position to constitute a burner unit and operable to constitute an oven heating unit.

A further important object of this invention is the provision of a stove-cabinet including a heating unit adapted for utilization as a burner or as an oven heating means, at the same time constituting a closure for the oven.

A still further object of this invention is the provision of a stove unit embodying an oven element having a removable tray and a detachable closure including heating elements and constituting when closed, an oven heating medium and when in open position, a burner device.

A further important object of this invention is the provision of a portable oven unit including heating elements and a burner structure hingedly connected thereto and adapted when not in use to be concealed from view and in appearance constitute one side of the oven.

With these and other objects in view, which will become apparent as the description proceeds, the invention resides in the construction, combination and arrangement of parts, hereinafter more fully described and claimed, and illustrated in the accompanying drawing, in which like characters of reference indicate like parts throughout the several figures, of which:

Fig. 1 is a perspective view of my improved stove cabinet with closures in open position.

Fig. 2 is a transverse section on the line 2—2 of Fig. 1, and

Fig. 3 illustrates a modified form of oven and burner units with the latter in open or operative position.

Briefly, my invention embodies a combined portable cabinet and stove unit and including novel oven and heating structures, the heating structures, when in open position, being utilizable as grills or burners and when closed as a heating medium for the oven, and at the same time as a closure therefore. In the modified form, the oven has integral heating units, with the burner structure normally foldable to constitute a continuation of the sides of the oven. The different forms are adaptable to different sized kitchens or kitchenettes where conservation of space is necessary, and the portability of such units permitting them to be advantageously moved as desired or to be placed in a cupboard or other place of concealment, when not in use.

In the illustrated embodiment characterizing this invention, there is shown a cabinet A including a stove section B and a kitchen cabinet section C. In the present instance the cabinet A is substantially rectangular in configuration and is formed with top 1, bottom 2, back 3 and ends 4, the latter formed with legs 5. Said cabinet is provided with a central vertical partition 6 suitably secured therein and which forms on one side stove section B and on the other cabinet section C.

Adapted to be normally positioned within the section B is a reflector metal cone shaped oven member 7 formed on either side adjacent its open end with integral or otherwise suitably secured legs 8 and adjacent its apex or rear end with a similar leg 9. The rear end of said member 7 is provided with a small opening 10 adapted to be normally closed by an external closure cap 11 frictionally or otherwise suitably secured to the cone, and reasonably secured within the cone is a metal tray or shelf member 12.

Preferably, an electric heating device 13 comprising a plurality of heating elements or burners 14 adapted to be mounted on and supported by the door or shelf member 15 hingedly secured to bottom 2 as at 16, and maintained in a horizontal plane, when in open position, by slidable or foldable brackets 17 having their outer ends secured to the said door 15 and their inner ends to the inner walls of end 4 partition 6, respectively. In order to operate door member 15 and to secure the same in elevated or closed position a handle and suitable catch member 18 is suitably secured central of the free edge of said door. The heating unit 13 is detachably and hingedly connected to the cone 7 as at 19 so that the cone and heating unit may be installed or removed from section B as a unit, or if desired may be detached as at 19. While I have preferably shown member 13 as an electrical unit, it is well understood that a gas or other suitable heating medium may be substituted therefor with equal facility.

In order to maintain to a maximum the heat within cone 7, the same may be provided with an asbestos or other suitable insulating material 20, and while I have preferably shown this covering as applied to the cone it may, if desired, likewise be applied to the interior wall surfaces of section B so that no appreciable heat can penetrate cabinet C. The unit 13 when in open or horizontal position constitutes a burner or heating unit on which is adapted to be placed the materials to be cooked or heated and when the door 15 is closed, the device 13 forms a closure for cone 7 and when in such position constitutes an oven heating unit. It will thus be seen that the unit 13 is adapted to function as a grate or grill heating unit when in one position, and as an oven heating unit when in another position, as will be clear without further discussion.

Section C is formed with a hinged top section 21 extended to a point substantially central of top 1 and, in the present instance, is also formed with a centrally disposed vertical partition 22, and on one side with a horizontal partition 23 on which is adapted to be slideably supported drawer 24, and forming thereunder an open section 25. Intermediate the section 22 and end 3 may be mounted a flour bin 26. A front closure or door 27 is hingedly connected to bottom 2 as at 28, constituting a shelf when in open position, and supported by brackets 29 similar to brackets 17, and adapted to be mounted on the inner surface of said door is a metal or other suitable mixing tray 30, said member 27 being provided with a catch and operating handle member 31 similar to 18, heretofore described. It will be noted that when the doors 15 and 30 are in closed position, the cabinet A presents an unbroken exterior surface, thereby presenting a pleasing appearance, and being portable may be conveniently moved when not in use, thereby effecting a conservation of space. Smoke and the like may be quickly discharged from cone 7 by the removal of cap 11, and for similar purposes section B is provided with suitable dampers 32 mounted in top 1, as will be well understood.

Figure 3 illustrates a modified form of my invention Ba and is substantially similar to section B except that it is detached from section C. In this form section Ba corresponding to section B is formed interiorly with suitable heating elements 33 and at one end with a door 34 hingedly secured to bottom 2a as at 35 and provided with operating handle 36. It is also formed with supporting legs 5a, and with an integral side section 37, and is substantially square in configuration. A shelf member 15a provided with a heating device 13a including heating elements or burners 14a hingedly secured to bottom 2a as at 16a. Secured to the free edge of member 15a is handle 18a.

The heating unit 13a is similar to 13 heretofore described except it is only utilizable as a burner or grill and is inoperative when in closed position, the oven in this form of the device being heated by heating units 34 mounted therein, and the cone 7 in this form may be dispensed with.

From the above it is apparent that I have designed a stove-cabinet adapted when not in use to present the appearance of an ordinary cabinet and expeditiously movable as desired. At the same time constituting a stove and kitchen cabinet combined to effect expedition of the cooking operation by having the necessary materials close at hand, and by such combination effecting a conservation of space in kitchenettes and like rooms of small dimensions.

Primarily, however, I have provided a stove unit embodying novel construction, wherein a burner or grill heating unit is not only adapted to function as such, but additionally as an oven heating unit, thereby greatly reducing the size of the stove structure with a consequent decrease in its production cost, yet without sacrificing either the oven or open burner features of the types of stoves heretofore in use, and which I have accomplished as heretofore described by means of my improved burner device constituting when in one position a grill heating device and in another position an oven heating medium.

Although in practice I have found that the form of my invention illustrated in the accompanying drawing and referred to in the above description as the preferred embodiment, is the most efficient and practical; yet realizing the conditions concurrent with the adoption of my invention will necessarily vary, I desire to emphasize that various minor changes in details of construction, proportion and arrangement of parts, may be resorted to within the scope of the appended claims without departing from or sacrificing any of the principles of this invention.

Having thus described my invention, what I desire protected by Letters Patent is as set forth in the following claims:

1. A cooking stove device comprising a supporting casing or oven housing, an oven member having an opening insertable in said casing, a heating unit hingedly connected to the oven member and movable to open and closed positions with respect thereto, whereby said unit when in closed position constitutes a closure and heating medium for said oven and when in open position a heating and supporting unit for cooking purposes independently of said oven.

2. A cooking stove device comprising an oven supporting housing or casing including a hinged side member, means for supporting said side in a horizontal plane, an oven member having an opening and removably insertable in said casing, an insulating covering on said oven member, a heating unit hingedly connected to said oven and suitably supported on said side member, whereby when said side is in a vertical plane it forms a closure for the casing and positions the heating unit in closing relation with respect to the open end of the oven for heating the latter, and when said side is in a horizontal plane it serves to position the heating unit for usage as a grill.

This specification signed this 17 day of February, A. D. 1930.

FLOYD JENNINGS BAKER.